(12) United States Patent
Su et al.

(10) Patent No.: US 9,829,687 B2
(45) Date of Patent: Nov. 28, 2017

(54) ZOOM LENS

(71) Applicant: Young Optics Inc., Hsinchu (TW)

(72) Inventors: Yuan-Hung Su, Hsinchu (TW); Kai-Yun Chen, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 170 days.

(21) Appl. No.: 14/699,293

(22) Filed: Apr. 29, 2015

(65) Prior Publication Data

US 2016/0097919 A1    Apr. 7, 2016

(30) Foreign Application Priority Data

Oct. 7, 2014 (TW) .............................. 103134946 A (51) Int. Cl.

| | | |
|---|---|---|
| *G02B 15/14* | (2006.01) | |
| *G02B 13/18* | (2006.01) | |
| *G02B 15/177* | (2006.01) | |
| *G02B 13/04* | (2006.01) | |
| *G02B 15/20* | (2006.01) | |
| *G02B 15/163* | (2006.01) | |
| *G02B 27/00* | (2006.01) | |
| *G02B 13/00* | (2006.01) | |
| *G02B 5/00* | (2006.01) | |
| *G02B 15/15* | (2006.01) | |
| *G02B 13/14* | (2006.01) | |

(52) U.S. Cl.
CPC ............ *G02B 15/177* (2013.01); *G02B 5/005* (2013.01); *G02B 13/009* (2013.01); *G02B 13/04* (2013.01); *G02B 13/146* (2013.01); *G02B 13/18* (2013.01); *G02B 15/14* (2013.01); *G02B 15/15* (2013.01); *G02B 15/163* (2013.01); *G02B 15/20* (2013.01); *G02B 27/0025* (2013.01)

(58) Field of Classification Search
CPC .. G02B 27/0025; G02B 15/177; G02B 15/20; G02B 13/18; G02B 13/009; G02B 15/14; G02B 15/163; G02B 13/04; G02B 5/005; G02B 15/15
USPC ....... 359/680, 683–685, 689, 690, 701, 716, 359/740, 753, 784–792
See application file for complete search history.

(56) References Cited

U.S. PATENT DOCUMENTS

| | | | | |
|---|---|---|---|---|
| 7,626,767 | B2* | 12/2009 | Kudo .................. | G02B 15/173 359/683 |
| 2009/0122418 | A1* | 5/2009 | Atsuumi .............. | G02B 15/173 359/684 |
| 2012/0013992 | A1* | 1/2012 | Yamasaki ............ | G02B 15/177 359/684 |
| 2012/0075729 | A1 | 3/2012 | Uemura | |

FOREIGN PATENT DOCUMENTS

TW     200841039     10/2008

* cited by examiner

*Primary Examiner* — Evelyn A Lester
(74) *Attorney, Agent, or Firm* — WPAT, PC (57) ABSTRACT

A zoom lens is provided. The zoom lens includes a first lens group, a second lens group, a third lens group and an aperture stop. The second lens group is disposed between the first lens group and the third lens group. The aperture stop is disposed between the first lens group and the second lens group. When the zoom lens zooms, the aperture stop is fixed without moving and the first lens group correspondingly moves.

22 Claims, 7 Drawing Sheets

ZOOM LENS

FIELD OF THE INVENTION

The present invention relates to a lens, and more particularly to a zoom lens.

BACKGROUND OF THE INVENTION

Image capture device is used to capture images of an object side through a lens and an image sensing element therein; wherein the lens is used to focus the light beam from the object side to the image sensing element. Generally, lens can be divided into fixed lens and zoom lens. Because having variable focal length, the zoom lens has some advantages such as the easy-to-use feature. A good zoom lens is defined to have good image quality at every focal length. Thus, it is quite important for a lens designer to design a zoom lens having good image quality at every focal length.

Currently, many patents about zoom lens have been published or disclosed, such as U.S. Pat. Nos. 8,369,021, 5,481,404, 8,477,427, 4,838,669, 8,654,451, 4,468,097, 5,146,366 and 5,132,848. However, the conventional zoom lens usually uses two or more than four groups of lens set. Specifically, for the zoom lens using two groups of lens set, the resolution optimization may not be achieved simultaneously in all the focal lengths at the wide-angle end, the telephoto end and the middle position; as a result, the resolution in some specific focal lengths must be sacrificed. On the contract, for the zoom lens using four or more groups of lens set, the manufacturing cost is high due to a relatively-complex driving mechanism for driving the four or more groups of lens set is required.

SUMMARY OF THE INVENTION

Therefore, one object of the present invention is to provide a zoom lens having improved image qualities at the telephoto end, wide-angle end and middle position.

An embodiment of the present invention provides a zoom lens, which includes a first lens group, a second lens group, a third lens group and an aperture stop. The second lens group is disposed between the first lens group and the third lens group. The aperture stop is disposed between the first lens group and the second lens group. When the zoom lens zooms, the aperture stop is fixed without moving and the first lens group correspondingly moves.

In summary, through employing a structure having three groups of lens set and disposing a fixed aperture stop between the first lens group and the second lens group, the zoom lens disclosed in the present invention has improved image qualities at the telephoto end, wide-angle end and middle position between the telephoto end and wide-angle end. In addition, compared with the conventional zoom lens having four groups of lens set, the zoom lens disclosed in the present invention has lower manufacturing cost due to having a less number of lens set group.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
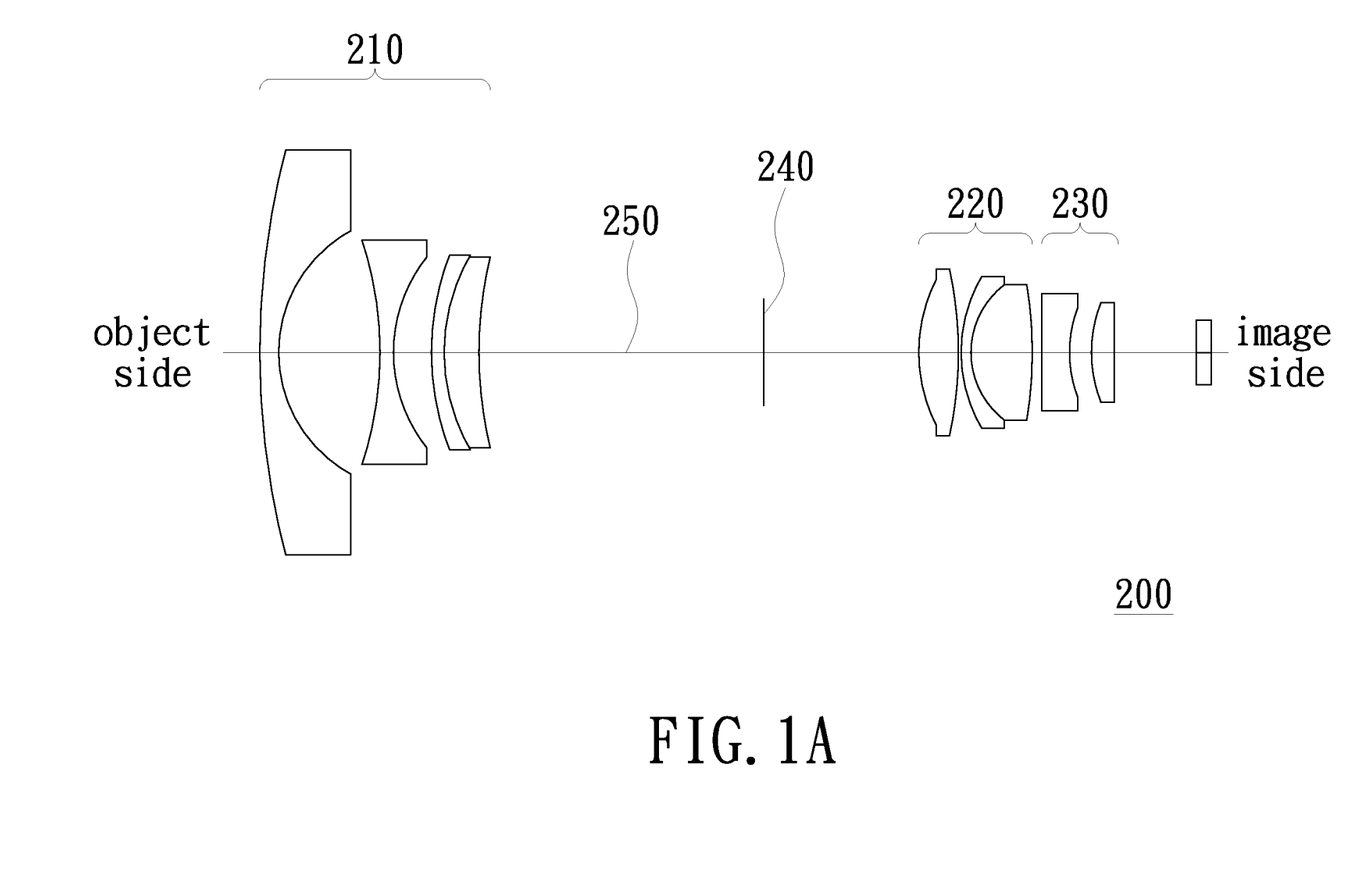
FIGS. 1A and 1B are schematic sectional views of a zoom lens at telephoto and wide-angle ends in accordance with an embodiment of the present invention, respectively.
Figure 1B:
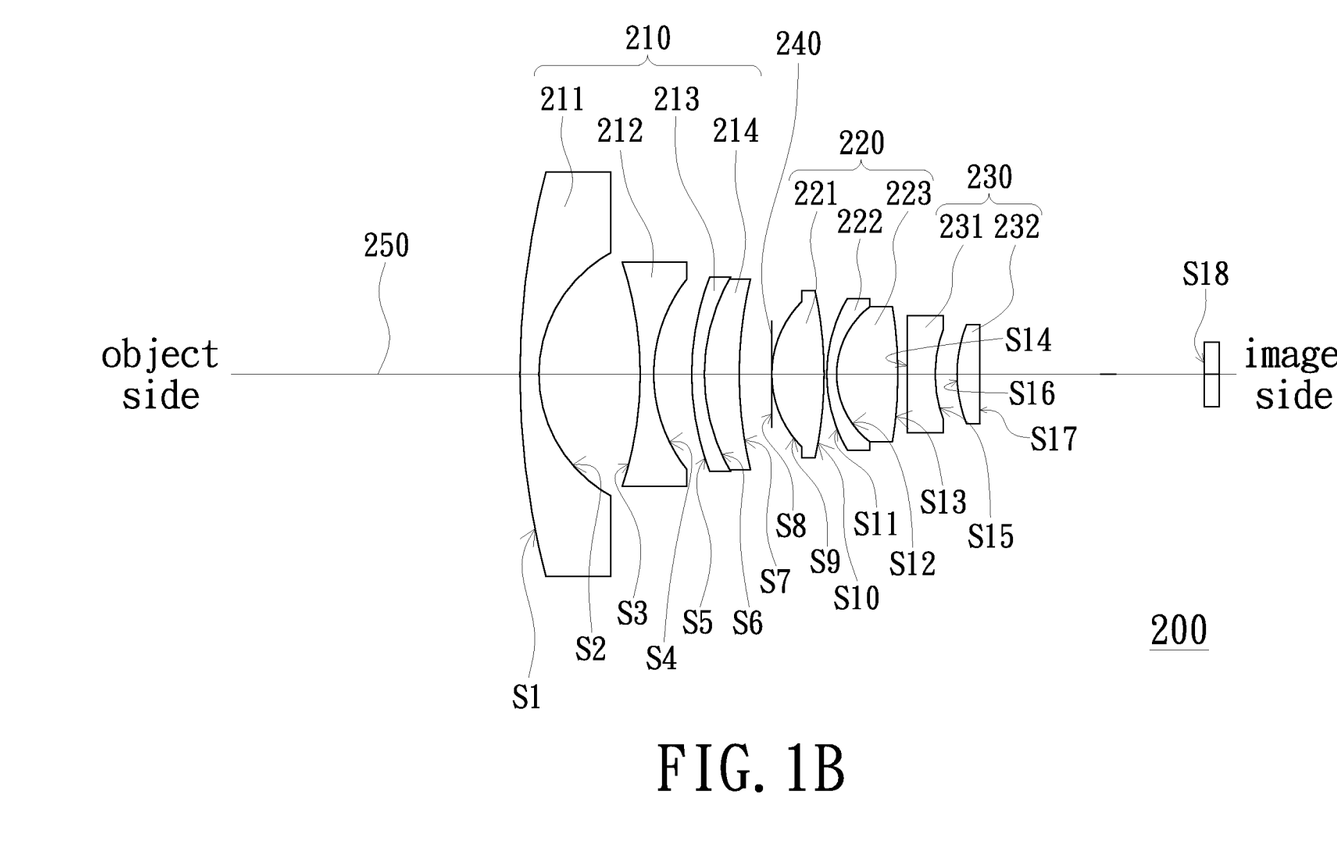

FIGS. 1A and 1B are schematic sectional views of a zoom lens at telephoto and wide-angle ends in accordance with an embodiment of the present invention, respectively. Please refer to FIG. 1A, first. As shown, the zoom lens 200 in the present embodiment includes a first lens group 210, a second lens group 220, a third lens group 230 and an aperture stop 240. The first lens group 210, the aperture stop 240, the second lens group 220 and the third lens group 230 are disposed sequentially along an optical axis 250 and in an order from an object side to an image side. In other words, the second lens group 220 is disposed between the first lens group 210 and the third lens group 230; and the aperture stop 240 is disposed between the first lens group 210 and the second lens group 220. In the present embodiment, when the zoom lens 200 zooms, the aperture stop 240 is fixed without moving and the first lens group 210, the second lens group 220 and the third lens group 230 correspondingly move.

Please refer to FIGS. 1A and 1B, together. Specifically, when the zoom lens 200 zooms from the wide-angle end (FIG. 1A) to the telephoto end (FIG. 1B), the aperture stop 240 is fixed without moving, the first lens group 210 is moved toward the aperture stop 240 and both of the second lens group 220 and the third lens group 230 are moved toward the aperture stop 240. Alternatively, when the zoom lens 200 zooms from the telephoto end to the wide-angle end, the aperture stop 240 is fixed without moving, the first lens group 210 is moved away from the aperture stop 240 and both of the second lens group 220 and the third lens group 230 are moved away from the aperture stop 240. In the present embodiment, the focusing of the zoom lens 200 is realized through fine tuning the position of the first lens group 210.

In the present embodiment, the first lens group 210 has negative refractive power, the second lens group 220 has positive refractive power, and the third lens group 230 has positive refractive power. The first lens group 210 includes, in an order from an object side to an image side, a first lens 211 having negative refractive power, a second lens 212 having negative refractive power, a third lens 213 having negative refractive power and a fourth lens 214 having positive refractive power. The second lens group 220 includes, in an order from an object side to an image side, a fifth lens 221 having positive refractive power, a sixth lens 222 having negative refractive power and a seventh lens 223 having positive refractive power. The third lens group 230 includes, in an order from an object side to an image side, an eighth lens 231 having negative refractive power and a ninth lens 232 having positive refractive power. The fourth lens 214 is disposed between the third lens 213 and the fifth lens 221; and the eighth lens 231 is disposed between the seventh lens 223 and the ninth lens 232. In the present embodiment, the third lens 213 and the fourth lens 214 may corporately form a cemented lens, and the sixth lens 222 and the seventh lens 223 may corporately form a cemented lens; but the present invention is not limited thereto.

Please refer to Table 1 for the related parameters of the zoom lens 200 in accordance with an embodiment of the present invention. It is to be noted that these parameters are merely examples, which should not unduly limit the scope of the claims. One of ordinary skill in the art would recognize many variations, alternatives, and modifications.

TABLE 1

| Surface | Radius of Curvature (mm) | Distance (mm) | Refractive Index | Abbe Number | Radius (mm) |
| --- | --- | --- | --- | --- | --- |
| S1 | 34.76 | 0.88 | 1.64 | 55.4 | 9.11 |
| S2 | 6.31 | 4.59 | | | 5.54 |
| S3 | −15.32 | 0.53 | 1.64 | 55.4 | 5.11 |
| S4 | 7.19 | 1.71 | | | 4.39 |
| S5 | 12.46 | 0.57 | 1.55 | 45.8 | 4.46 |
| S6 | 8.72 | 1.54 | 1.92 | 18.9 | 4.38 |
| S7 | 17.55 | Varying distance A | | | 4.34 |
| S8 | Infinite | Varying distance B | | | 2.72 |
| S9 | 6.58 | 1.70 | 1.5 | 81.5 | 3.75 |
| S10 | −33.40 | 0.11 | | | 3.65 |
| S11 | 6.51 | 0.43 | 1.61 | 44.3 | 3.38 |
| S12 | 3.89 | 2.85 | 1.44 | 94.9 | 3.07 |
| S13 | −10.83 | Varying distance C | | | 2.96 |
| S14 | 220 | 1.26 | 1.72 | 34.7 | 2.59 |
| S15 | 5.54 | 1.00 | | | 2.10 |
| S16 | 5.66 | 1.05 | 1.50 | 81.5 | 2.20 |
| S17 | −46.23 | Varying distance D | | | 2.00 |
| S18 | Infinite | 0.7 | 1.52 | 64.1 | 1.76 |

TABLE 2

| | Wide-angle End | Telephoto End |
| --- | --- | --- |
| Varying distance A | 13.47 | 2.18 |
| Varying distance B | 6.30 | 0.10 |
| Varying distance C | 0.14 | 0.30 |
| Varying distance D | 3.66 | 9.71 |

In Table 1, the surfaces S1, S2 are the two surfaces of the first lens 211; and the surfaces S3, S4 are the two surfaces of the second lens 212. The third lens 213 and the fourth lens 214 may corporately form a cemented lens. Thus, the surface S5 is a surface of the third lens 213; the surface S6 is the surface where the third lens 213 and the fourth lens 214 are cemented with each other; and the surface S7 is another surface of the fourth lens 214. The surface S8 is the aperture stop 240. The surfaces S9, S10 are the two surfaces of the fifth lens 221. The sixth lens 222 and the seventh lens 223 may corporately form a cemented lens. Thus, the surface S11 is a surface of the sixth lens 222; the surface S12 is the surface where the sixth lens 222 and the seventh lens 223 are cemented with each other; and the surface S13 is another surface of the seventh lens 223. The surfaces S14, S15 are the two surfaces of the eighth lens 231; and the surfaces S16, S17 are the two surfaces of the ninth lens 232. The surface S18 is the surface of the image side. When an image capturing device is equipped with the zoom lens 200, the surface S18 is the image sensing surface of an image sensing element. The distance in Table 1 is referred to a linear distance between two adjacent surfaces on the optical axis 250. For example, the distance of surface S1 is referred to the linear distance between the surfaces S1, S2 on the optical axis 250.

In the present embodiment, the surfaces S7, S8, S13 and S17 each have a varying distance. As shown in Table 2, in particular, the surface S7 has a distance 13.47 millimeters (mm) at the wide-angle end and a distance 2.18 mm at the telephoto end; the surface S8 has a distance 6.30 mm at the wide-angle end and a distance 0.10 mm at the telephoto end; the surface S13 has a distance 0.14 mm at the wide-angle end and a distance 0.30 mm at the telephoto end; the surface S17 has a distance 3.66 mm at the wide-angle end and a distance 9.71 mm at the telephoto end.

In summary, through employing a structure having three groups of lens set and disposing the fixed aperture stop 240 between the first lens group 210 and the second lens group 220, the zoom lens 200 in the present embodiment has improved image qualities at the telephoto end, wide-angle end and middle position between the telephoto end and wide-angle end. In addition, compared with the conventional zoom lens having four groups of lens set, the zoom lens 200 in the present embodiment has lower manufacturing cost due to having a less number of lens set group. Moreover, to make the zoom lens 200 in the present embodiment have confocal effect of visible light and infrared light, the second lens group 220 and the third lens group 230 may include at least one lens having Abbe number greater than 45 and having positive refractive power. For example, the second lens group 220 and the third lens group 230 in the present embodiment may have three lenses having Abbe number greater than 45 and having positive refractive power; wherein the aforementioned three lenses are the fifth lens 221, the seventh lens 223 and the ninth lens 232.

Further, in order to eliminate the aberration caused by a large aperture, the second lens group 220 and the third lens group 230 may include at least one aspheric lens. For example, the second lens group 220 and the third lens group 230 in the present embodiment may have two aspheric lenses; wherein the aforementioned two aspheric lenses are the fifth lens 221 in the second lens group 220 and the ninth lens 232 in the third lens group 230. The shapes of the surfaces S9, S10 of the fifth lens 221 and the shapes of the surfaces S16, S17 of the ninth lens 232 satisfy the following conditional expression:

$$Z(h) = \frac{h^2/r}{1 + \sqrt{1 - (1+k)(h^2/r^2)}} + C_2 h^2 + C_4 h^4 + C_6 h^6 + C_8 h^8 + C_{10} h^{10} \ldots$$

where Z(h) denotes a sag in the optical axis 250 direction; r denotes the radius of curvature near the optical axis 250 (e.g., the radius of curvature of surfaces S9, S10, S16 and S17 in Table 1); k denotes a conical constant; h denotes a height of the aspheric surface (i.e. the distance from the lens center to the lens edge; $C_2$, $C_4$, $C_6$, $C_8$, $C_{10}$ . . . each denotes an aspheric coefficient. Please refer to Table 3 for the detailed aspheric parameter values.

TABLE 3

|  | S9 | S10 | S16 | S17 |
|---|---|---|---|---|
| k | 0 | 0 | 0 | 0 |
| $C_2$ | 0 | 0 | 0 | 0 |
| $C_4$ | −0.00066566 | −1.92333E−05 | −0.00106632 | 0.00016173 |
| $C_6$ | −6.5400E−05 | −1.3839E−05 | 0.0001126 | 0.00035964 |
| $C_8$ | 6.483E−06 | −8.2212E−07 | −4.5522E−05 | −9.7992E−05 |
| $C_{10}$ | −7.0570E−07 | −3.2647E−07 | 3.6671E−06 | 8.4364E−06 |

Figure 2A:
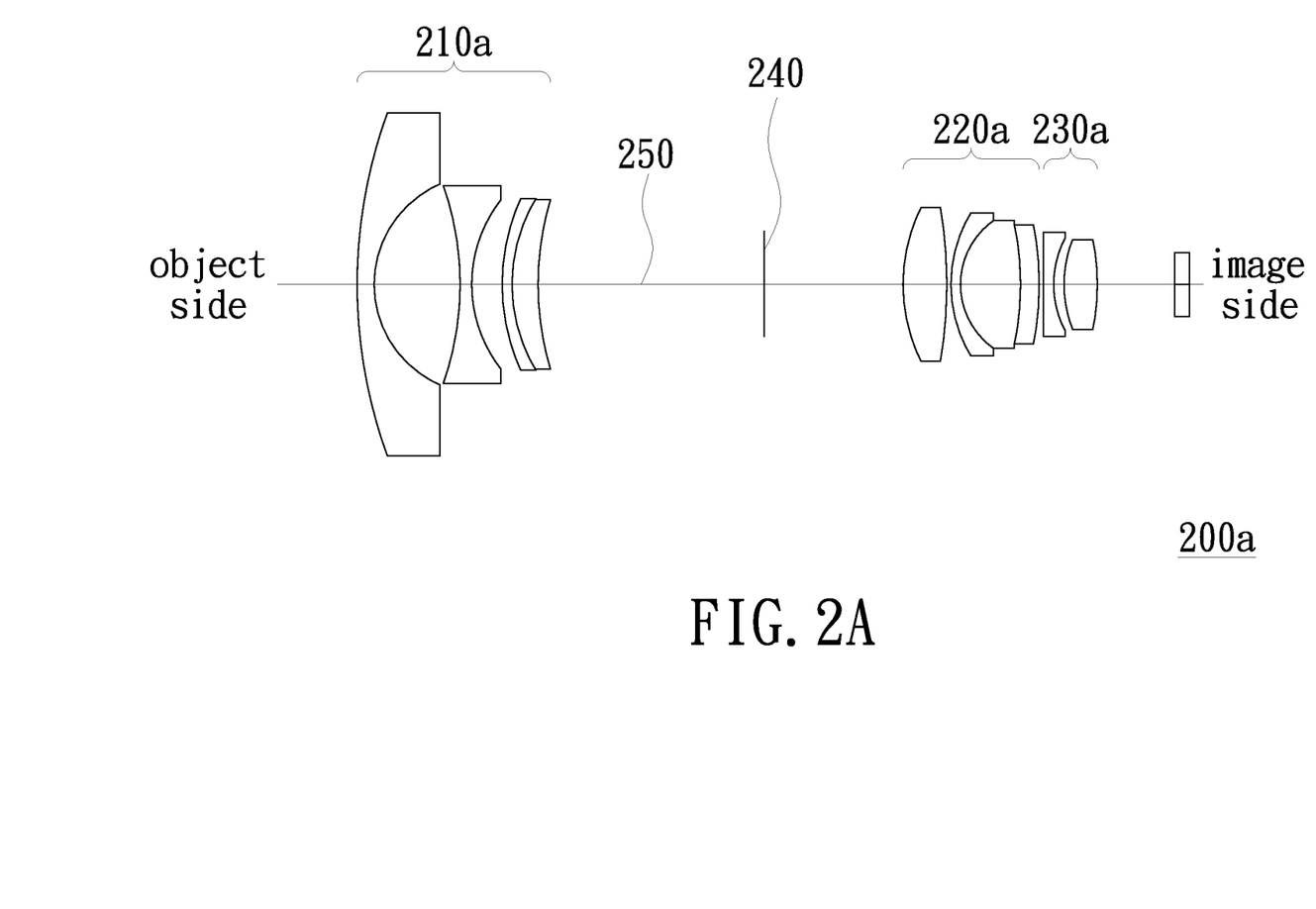
FIGS. 2A and 2B are schematic sectional views of a zoom lens at telephoto and wide-angle ends in accordance with another embodiment of the present invention, respectively.
Figure 2B:
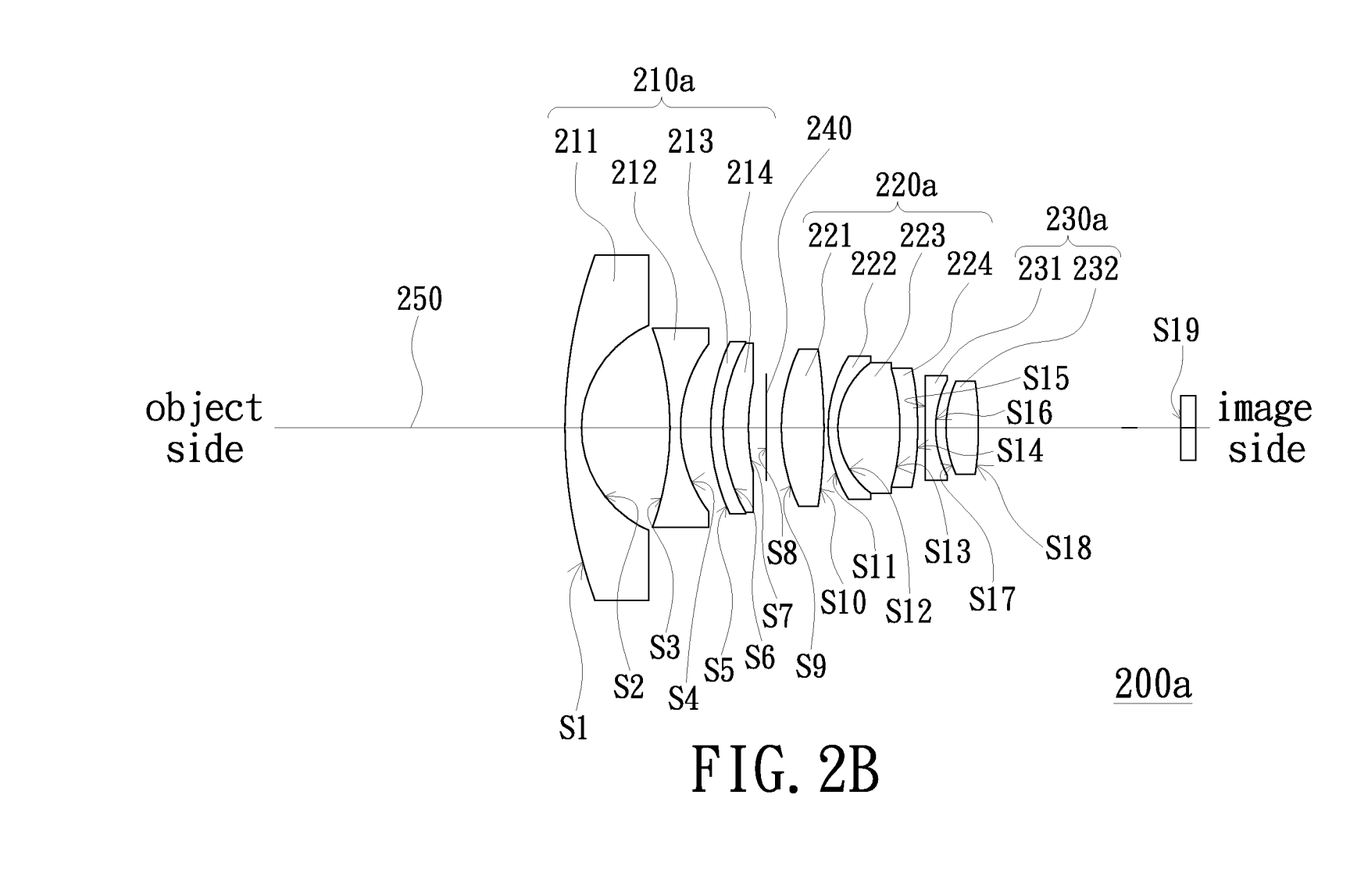

FIGS. 2A and 2B are schematic sectional views of a zoom lens at telephoto and wide-angle ends in accordance with another embodiment of the present invention, respectively. Please refer to FIGS. 2A and 2B. The zoom lens 200a in the present embodiment has structure and advantages similar to that of the zoom lens 200 in the previous embodiment, thus, only the different part between the zoom lens 200, 200a will be described and no redundant detail is to be given herein. The main difference between the two zoom lens 200, 200a is that the second lens group 220a in the zoom lens 200a in the present embodiment further includes a tenth lens 224 having negative refractive power. The tenth lens 224 is disposed between the seventh lens 223 in the second lens group 220a and the eighth lens 231 in the third lens group 230a. In the present embodiment, the tenth lens 224, the sixth lens 222 and the seventh lens 223 may corporately form a cemented lens. Please refer to Tables 4, 5 and 6 for the related parameters of the zoom lens 200a in accordance with an embodiment of the present invention.

TABLE 4

| Surface | Radius of Curvature (mm) | Distance (mm) | Refractive Index | Abbe Number | Radius (mm) |
|---|---|---|---|---|---|
| S1 | 25.06 | 0.82 | 1.64 | 55.4 | 8.26 |
| S2 | 5.38 | 4.14 |  |  | 4.91 |
| S3 | −14.32 | 0.56 | 1.64 | 55.4 | 4.76 |
| S4 | 6.66 | 1.50 |  |  | 4.08 |
| S5 | 10.05 | 0.47 | 1.55 | 45.8 | 4.14 |
| S6 | 7.92 | 1.31 | 1.92 | 18.9 | 4.06 |
| S7 | 14.74 | Varying distance E |  |  | 3.92 |
| S8 | Infinite | Varying distance F |  |  | 2.56 |
| S9 | 6.78 | 2.08 | 1.5 | 81.5 | 3.75 |
| S10 | −36.17 | 0.16 |  |  | 3.67 |
| S11 | 6.33 | 0.48 | 1.61 | 44.3 | 3.45 |
| S12 | 3.80 | 2.91 | 1.44 | 94.9 | 3.11 |
| S13 | −13.18 | 0.91 | 1.72 | 29.2 | 2.89 |
| S14 | −12.96 | Varying distance G |  |  | 2.75 |
| S15 | −520.70 | 0.49 | 1.63 | 35.7 | 2.54 |
| S16 | 4.97 | 0.50 |  |  | 2.26 |
| S17 | 4.86 | 1.53 | 1.50 | 81.5 | 2.20 |
| S18 | −19.32 | Varying distance H |  |  | 2.19 |
| S19 | Infinite | 0.7 | 1.52 | 64.1 | 1.78 |

TABLE 5

|  | Wide-angle End | Telephoto End |
|---|---|---|
| Varying distance E | 10.89 | 1.41 |
| Varying distance F | 6.73 | 0.09 |
| Varying distance G | 0.17 | 0.34 |
| Varying distance H | 3.66 | 10.12 |

The sixth lens 222, the seventh lens 223 and the tenth lens 224 may corporately form a cemented lens. Thus, the surface S11 is a surface of the sixth lens 222; the surface S12 is the surface where the sixth lens 222 and the seventh lens 223 are cemented with each other; the surface S13 is the surface where the seventh lens 223 and the tenth lens 224 are cemented with each other; and the surface S14 is another surface of the tenth lens 224. The surfaces S15, S16 are the two surfaces of the eighth lens 231; and the surfaces S17, S18 are the two surfaces of the ninth lens 232. The surface S19 is the surface of the image side.

In the present embodiment, the surfaces S7, S8, S14 and S18 each have a varying distance. As shown in Table 5, in particular, the surface S7 has a distance 10.89 mm at the wide-angle end and a distance 1.41 mm at the telephoto end; the surface S8 has a distance 6.73 mm at the wide-angle end and a distance 0.09 mm at the telephoto end; the surface S14 has a distance 0.17 mm at the wide-angle end and a distance 0.34 mm at the telephoto end; the surface S18 has a distance 3.66 mm at the wide-angle end and a distance 10.12 mm at the telephoto end.

Similar to the zoom lens 200 in the previous embodiment, in order to eliminate the aberration caused by a large aperture, the second lens group 220a and the third lens group 230a in the zoom lens 200b in the present embodiment may include at least one aspheric lens. For example, the second lens group 220a and the third lens group 230a in the present embodiment may have two aspheric lenses; wherein the aforementioned two aspheric lenses are the fifth lens 221 and the ninth lens 232. The shapes of the surfaces S9, S10 of the fifth lens 221 and the shapes of the surfaces S17, S18 of the ninth lens 232 satisfy the aforementioned conditional expression. Please refer to Table 6 for the values of the aspheric parameters $C_2$, $C_4$, $C_6$, $C_8$, and $C_{10}$.

TABLE 6

|  | S9 | S10 | S17 | S18 |
|---|---|---|---|---|
| k | 0 | 0 | 0 | 0 |
| $C_2$ | 0 | 0 | 0 | 0 |
| $C_4$ | −0.00061307 | −0.00015649 | −0.00199597 | −0.00055566 |
| $C_6$ | −3.3316E−05 | −3.4643E−06 | −7.969E−06 | 0.00011004 |
| $C_8$ | 3.05887E−06 | −2.3608E−07 | −1.034E−05 | −3.5693E−05 |
| $C_{10}$ | −3.1668E−07 | −1.746E−07 | −1.4866E−06 | 8.6798E−07 |

The advantages of the zoom lens 200a in the present embodiment are similar to that of the zoom lens 200 in the previous embodiment, and no redundant detail is to be given herein.

Figure 3A:
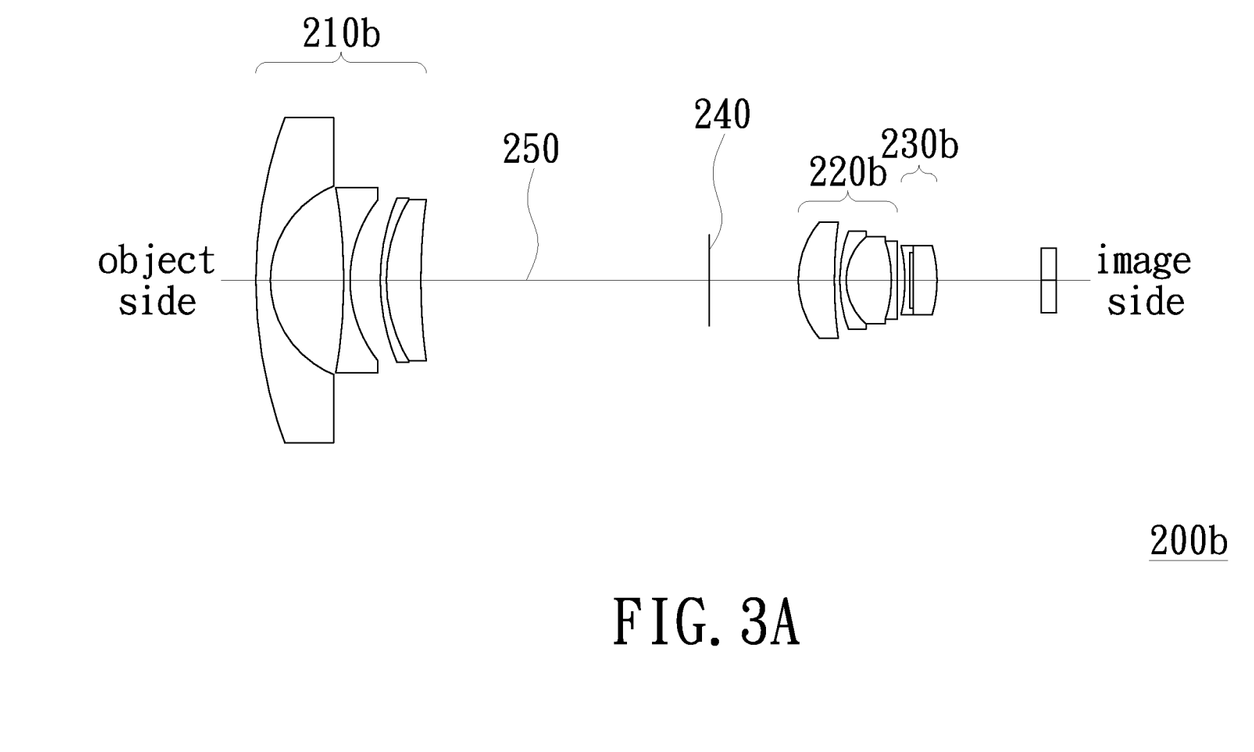
FIGS. 3A and 3B are schematic sectional views of a zoom lens at telephoto and wide-angle ends in accordance with still another embodiment of the present invention, respectively.
Figure 3B:
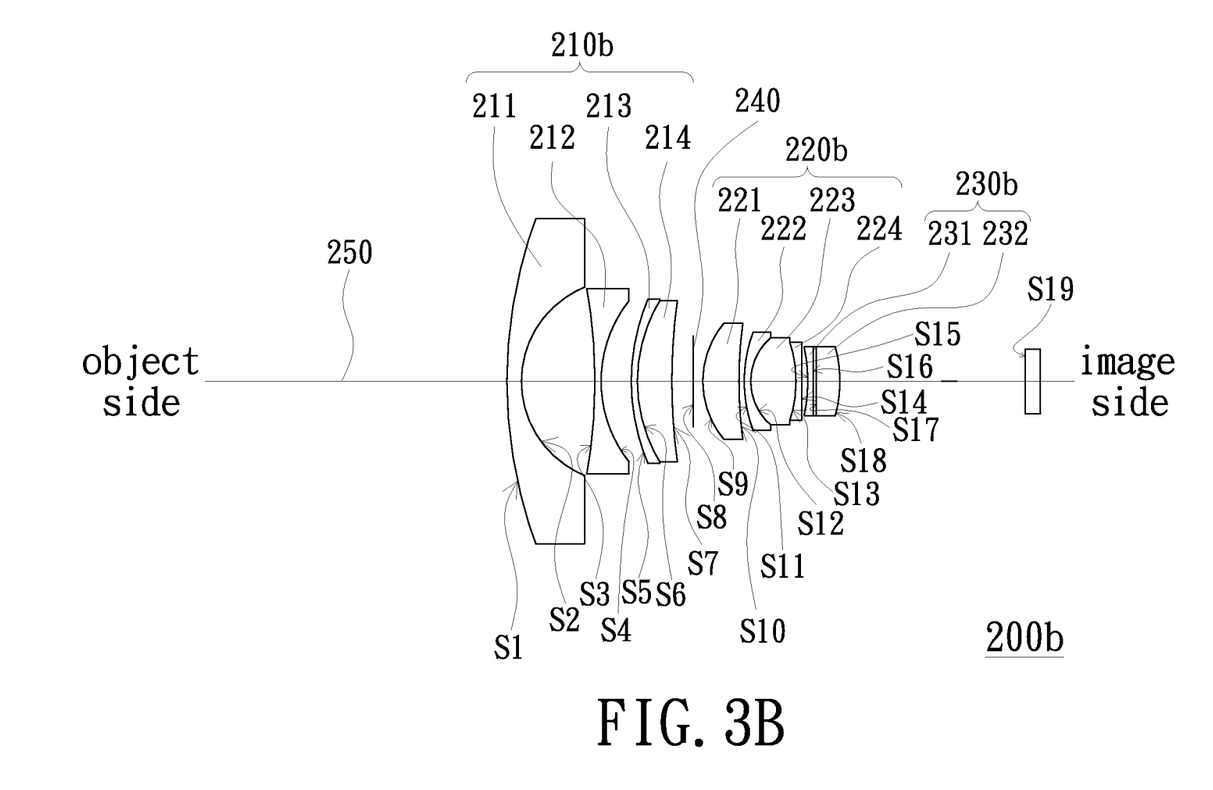

FIGS. 3A and 3B are schematic sectional views of a zoom lens at telephoto and wide-angle ends in accordance with still another embodiment of the present invention, respectively. Please refer to FIGS. 3A and 3B. The zoom lens 200b in the present embodiment has structure and advantages similar to that of the zoom lens 200a in the previous embodiment, thus, only the different part between the zoom lens 200a, 200b will be described and no redundant detail is to be given herein. To make the zoom lens 200b in the present embodiment have a confocal effect of visible light and infrared light, the second lens group 220b and the third lens group 230b in the zoom lens 200b in the present embodiment may include at least one lens having Abbe number greater than 35 and having positive refractive power. For example, the second lens group 220b and the third lens group 230b in the present embodiment may have three lenses having Abbe number greater than 35 and having positive refractive power; wherein the aforementioned three lenses are the fifth lens 221, the seventh lens 223 and the ninth lens 232.

Please refer to Tables 7, 8 and 9 for the related parameters of the zoom lens 200b in accordance with an embodiment of the present invention.

TABLE 7

| Surface | Radius of Curvature (mm) | Distance (mm) | Refractive Index | Abbe Number | Radius (mm) |
|---|---|---|---|---|---|
| S1 | 52.46 | 1.68 | 1.52 | 64.2 | 17.75 |
| S2 | 11.19 | 7.85 | | | 10.32 |
| S3 | −60.45 | 0.65 | 1.88 | 40.8 | 10.18 |
| S4 | 14.31 | 3.43 | | | 8.81 |
| S5 | 23.99 | 0.65 | 1.50 | 81.6 | 8.97 |
| S6 | 17.61 | 3.61 | 1.92 | 20.9 | 8.86 |
| S7 | 47.5 | Varying distance I | | | 8.50 |
| S8 | Infinite | Varying distance J | | | 5.00 |
| S9 | 9.7 | 3.98 | 1.69 | 52.7 | 6.23 |
| S10 | 82.00 | 0.49 | | | 5.69 |
| S11 | 15.94 | 0.65 | 1.65 | 33.8 | 5.30 |
| S12 | 6.02 | 5.01 | 1.50 | 81.6 | 4.66 |
| S13 | −13.92 | 0.65 | 1.69 | 31.3 | 4.14 |
| S14 | Infinite | Varying distance K | | | 3.93 |
| S15 | −22.40 | 0.65 | 1.73 | 28.5 | 3.80 |
| S16 | 69.37 | 0.32 | | | 3.77 |
| S17 | 45.66 | 2.58 | 1.85 | 38.8 | 3.77 |
| S18 | −17.42 | Varying distance L | | | 3.80 |
| S19 | | 1.4 | 1.52 | 64.2 | 3.4 |

TABLE 8

| | Wide-angle End | Telephoto End |
|---|---|---|
| Varying distance I | 29.02 | 2.46 |
| Varying distance J | 9.85 | 0.10 |
| Varying distance K | 0.77 | 0.55 |
| Varying distance L | 6.75 | 16.73 |

In the present embodiment, the surfaces S7, S8, S14 and S18 each have a varying distance. As shown in Table 8, in particular, the surface S7 has a distance 29.02 mm at the wide-angle end and a distance 2.46 mm at the telephoto end; the surface S8 has a distance 9.85 mm at the wide-angle end and a distance 0.10 mm at the telephoto end; the surface S14 has a distance 0.77 mm at the wide-angle end and a distance 0.55 mm at the telephoto end; the surface S18 has a distance 6.75 mm at the wide-angle end and a distance 16.73 mm at the telephoto end.

Please refer to Table 9 for the values of the aspheric parameters $C_2$, $C_4$, $C_6$, $C_8$, and $C_{10}$.

TABLE 9

| | S9 | S10 | S17 | S18 |
|---|---|---|---|---|
| k | 0 | 0 | 0 | 0 |
| $C_2$ | 0 | 0 | 0 | 0 |
| $C_4$ | −2.9130E−05 | 6.7755E−05 | −3.1864E−04 | −7.7748E−05 |
| $C_6$ | 9.7061E−08 | 2.0751E−07 | −1.0504E−05 | −6.3683E−05 |
| $C_8$ | −2.7719E−09 | 5.8169E−09 | 2.8871E−07 | 1.1704E−07 |
| $C_{10}$ | 8.8231E−11 | −1.7519E−11 | −1.8002E−08 | −7.3918E−09 |

The advantages of the zoom lens 200b in the present embodiment are similar to that of the zoom lens 200a in the previous embodiment, and no redundant detail is to be given herein.

Figure 4:
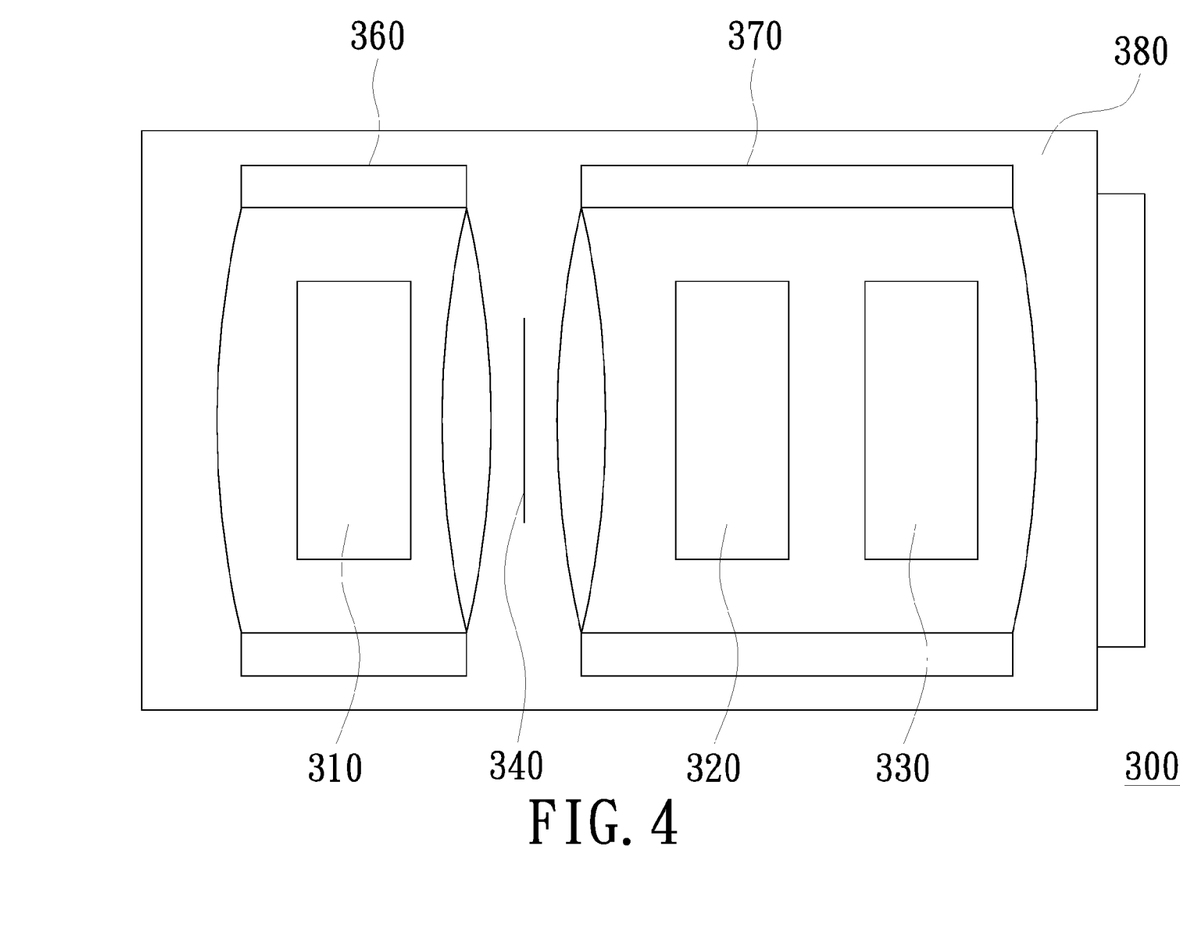
FIG. 4 is a schematic sectional view of a zoom lens in accordance with yet another embodiment of the present invention.

FIG. 4 is a schematic sectional view of a zoom lens in accordance with yet another embodiment of the present invention. Please refer to FIG. 4. As shown, the zoom lens 300 in the present embodiment includes a first lens group 310, a second lens group 320, a third lens group 330, an aperture stop 340, a focus ring 360, a zoom ring 370 and a lens barrel 380. The first lens group 310 is disposed in and driven by the focus ring 360. The second lens group 320 and the third lens group 330 are disposed in and driven by the zoom ring 370. The aperture stop 340 is disposed between the focus ring 360 and the zoom ring 370. The focus ring 360, the aperture stop 340 and the zoom ring 370 are disposed in the lens barrel 380. Each one of the first lens group 310, second lens group 320 and third lens group 33 may be implemented with any one of the first, second or third lens group of the zoom lens disclosed in the previous embodiments. In the present embodiment, the focus ring 360 is used for focusing and the zoom ring 370 is used for zooming.

In summary, through employing a structure having three groups of lens set and disposing a fixed aperture stop between the first lens group and the second lens group, the zoom lens disclosed in the present invention has improved image qualities at the telephoto end, wide-angle end and middle position between the telephoto end and wide-angle end. In addition, compared with the conventional zoom lens having four groups of lens set, the zoom lens disclosed in the present invention has lower manufacturing cost due to having a less number of lenses set group. Further, through providing at least one lens having Abbe number greater than 35 (or even greater than 45) and having positive refractive power in the second lens group and the third lens group, the zoom lens disclosed in the present invention can have confocal effect of visible light and infrared light. Moreover, through providing at least one aspheric lens in the second lens group and the third lens group, the zoom lens disclosed in the present invention can eliminate the aberration caused by a large aperture. Furthermore, the zoom lens disclosed in the present invention is more convenient to use due to having a large aperture up to f/1.2.

Of particular note, in one embodiment, the second lens group has positive refractive power, the third lens group has positive refractive power, and the second lens group and the third lens group corporately have positive refractive power. In another embodiment, the second lens group has negative refractive power, the third lens group has positive refractive power, and the second lens group and the third lens group corporately have positive refractive power. In still another embodiment, the second lens group has positive refractive power, the third lens group has negative refractive power, and the second lens group and the third lens group corporately have positive refractive power.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A zoom lens, comprising:
a first lens group;
a second lens group, comprising a cemented lens;
a third lens group; and
an aperture stop;
wherein the second lens group is disposed between the first lens group and the third lens group, the aperture stop is disposed between the first lens group and the second lens group, wherein when the zoom lens zooms, the aperture stop is fixed without moving and the first lens group and the third lens group moves relative to the aperture stop;
wherein a first distance is defined as a distance, between the aperture stop and the farthest lens surface of the third lens group to the aperture stop, along an optical axis when the zoom lens is at a telephoto end; a second distance is defined as a distance, between the aperture stop and the farthest lens surface of the third lens group to the aperture stop, along the optical axis when the zoom lens is at a wide-angle end,
wherein the first distance is smaller than the second distance.

2. The zoom lens according to claim 1, wherein the zoom lens comprises no less than 9 lenses.

3. The zoom lens according to claim 1, wherein the second lens group and the third lens group comprise at least a lens having an Abbe number greater than 35 and having positive refractive power.

4. The zoom lens according to claim 1, wherein the first lens group comprises 4 lenses, the second lens group comprises 3 lenses and the third lens group comprises 2 lenses.

5. The zoom lens according to claim 4, wherein each of the second lens group and the third lens group comprise an aspheric lens respectively.

6. The zoom lens according to claim 4, wherein the first lens group has negative refractive power and comprises a first lens having a negative refractive power, a second lens having a negative refractive power, a third lens having a negative refractive power and a fourth lens having a positive refractive power which are disposed sequentially, the second lens group has positive refractive power and comprises a fifth lens having a positive refractive power, a sixth lens having a negative refractive power and a seventh lens having a positive refractive power which are disposed sequentially, the third lens group has positive refractive power and comprises an eighth lens having a negative refractive power and a ninth lens having a positive refractive power, the fourth lens is disposed between the third lens and the fifth lens, the eighth lens is disposed between the seventh lens and the ninth lens.

7. The zoom lens according to claim 6, wherein the second lens group further comprises a tenth lens having a negative refractive power, the tenth lens is disposed between the seventh lens and the eighth lens.

8. The zoom lens according to claim 7, wherein the fifth lens, the seventh lens and the ninth lens have an Abbe number greater than 45.

9. The zoom lens according to claim 7, wherein the fifth lens, the seventh lens and the ninth lens have an Abbe number greater than 35.

10. The zoom lens according to claim 7, wherein the fifth lens and the ninth lens are an aspheric lens.

11. The zoom lens according to claim 7, wherein the third lens and the fourth lens corporately form a cemented lens, and the sixth lens, the seventh lens and the tenth lens corporately form a cemented lens.

12. The zoom lens according to claim 6, wherein the farthest lens surface of the second lens group to the aperture stop is a convex surface.

13. The zoom lens according to claim 6, wherein the fifth lens, the seventh lens and the ninth lens have an Abbe number greater than 45.

14. The zoom lens according to claim 6, wherein the fifth lens, the seventh lens and the ninth lens have an Abbe number greater than 35.

15. The zoom lens according to claim 6, wherein the fifth lens and the ninth lens are an aspheric lens.

16. The zoom lens according to claim 6, wherein the zoom lens satisfied at least one of the following limitation of:
the third lens and the fourth lens corporately form a cemented lens; or
the sixth lens and the seventh lens corporately form a cemented lens.

17. The zoom lens according to claim 1, wherein when the zoom lens zooms, the second lens group and the third lens group move relative to the aperture stop.

18. The zoom lens according to claim 17, further comprising:
a focus ring, wherein the first lens group is disposed in and driven by the focus ring;
a zoom ring, wherein the second lens group and the third lens group are disposed in and driven by the zoom ring, and the aperture stop is disposed between the focus ring and the zoom ring; and
a lens barrel, wherein the focus ring, the aperture stop and the zoom ring are disposed in the lens barrel.

19. The zoom lens according to claim 17, wherein when the zoom lens zooms from the wide-angle end to the telephoto end, the first lens group is moved toward the aperture stop and both of the second lens group and the third lens group are moved toward the aperture stop, wherein when the zoom lens zooms from the telephoto end to the wide-angle end, the first lens group is moved away from the aperture stop and both of the second lens group and the third lens group are moved away from the aperture stop.

20. A zoom lens, comprising:
a first lens group;
a second lens group;
a third lens group;
an aperture stop, wherein the second lens group is disposed between the first lens group and the third lens group, the aperture stop is disposed between the first lens group and the second lens group, wherein when the zoom lens zooms, the aperture stop is fixed without moving and the first lens group moves relative to the aperture stop;
a focus ring, wherein the first lens group is disposed in and driven by the focus ring; and
a zoom ring, wherein the second lens group and the third lens group are disposed in and driven by the zoom ring, and the aperture stop is disposed between the focus ring and the zoom ring.

21. The zoom lens according to claim 20, wherein the first lens group has negative refractive power and comprises at least 4 lenses, the second lens group has positive refractive power and comprises at least 3 lenses, the third lens group has positive refractive power and comprises at least 2 lenses, the zoom lens comprises at least two cemented lens and two aspheric lens.

22. The zoom lens according to claim 20, wherein the first lens group has negative refractive power and comprises a first lens has a second lens having negative refractive power, a third lens having negative refractive power and a fourth lens having positive refractive power which are disposed sequentially, the second lens group comprises a fifth lens having positive refractive power, a sixth lens having negative refractive power and a seventh lens having a positive refractive power which are disposed sequentially, the third lens group comprises an eighth lens having negative refractive power and a ninth lens having positive refractive power, the fourth lens is disposed between the third lens and the fifth lens, the eighth lens is disposed between the seventh lens and the ninth lens.

* * * * *